(12) United States Patent
Shivdeo

(10) Patent No.: US 9,037,547 B1
(45) Date of Patent: May 19, 2015

(54) BACKUP TIME DEDUPLICATION OF COMMON VIRTUAL DISKS FROM VIRTUAL MACHINE BACKUP IMAGES

(75) Inventor: Vinayak Sudhakar Shivdeo, Pune (IN)

(73) Assignee: Symantec Corporation, Mountain View, CA (US)

( * ) Notice: Subject to any disclaimer, the term of this patent is extended or adjusted under 35 U.S.C. 154(b) by 289 days.

(21) Appl. No.: 12/882,373

(22) Filed: Sep. 15, 2010

(51) Int. Cl.
*G06F 17/30* (2006.01)

(52) U.S. Cl.
CPC .... *G06F 17/30156* (2013.01); *G06F 17/30575* (2013.01)

(58) Field of Classification Search
USPC ......................................................... 707/664
See application file for complete search history.

(56) References Cited

U.S. PATENT DOCUMENTS

| | | | |
|---|---|---|---|
| 7,577,722 B1 * | 8/2009 | Khandekar et al. ........... | 709/220 |
| 8,065,714 B2 * | 11/2011 | Budko et al. ...................... | 726/4 |
| 2007/0244938 A1 * | 10/2007 | Michael et al. ................ | 707/204 |
| 2008/0189700 A1 * | 8/2008 | Schmidt et al. .................... | 718/1 |
| 2009/0037680 A1 * | 2/2009 | Colbert et al. ................. | 711/162 |
| 2010/0049750 A1 * | 2/2010 | Srivastava et al. ............. | 707/202 |
| 2010/0077165 A1 * | 3/2010 | Lu et al. ......................... | 711/162 |
| 2010/0257523 A1 * | 10/2010 | Frank ................................ | 718/1 |
| 2011/0087640 A1 * | 4/2011 | Dodd et al. .................... | 707/693 |

* cited by examiner

*Primary Examiner* — Usmaan Saeed
*Assistant Examiner* — Jagdish Pandya
(74) *Attorney, Agent, or Firm* — Campbell Stephenson LLP

(57) ABSTRACT

Various techniques deduplicate common virtual disks during backups of virtual machines. For example, one method involves receiving a request to perform a backup operation to backup one or more virtual machine and then performing the backup operation in response to receiving the request. Performing the backup operation involves detecting whether a virtual disk associated with a virtual machine is already identified in a backup catalog for the backup operation, based upon a globally unique identifier associated with the virtual disk, and selecting to create a reference to a backup copy of the virtual disk instead of creating another copy of the virtual disk, if the backup catalog already identifies the virtual disk. Performing the backup operation can also involve accessing information identifying a hierarchy of virtual disks.

21 Claims, 6 Drawing Sheets

BACKUP TIME DEDUPLICATION OF COMMON VIRTUAL DISKS FROM VIRTUAL MACHINE BACKUP IMAGES

FIELD OF THE INVENTION

This invention relates to backups and, more particularly, to backing up virtual machines.

DESCRIPTION OF THE RELATED ART

Virtualization systems allow multiple operating systems (which can actual be separate instances of the same type of operating system) to execute during the same time period on the same hardware. Each executing operating system acts as an independent "virtual machine" and can be interacted with and used in substantially the same manner as standalone operating system executing on independent hardware. Virtual machines allow increased usage of hardware resources by effectively turning one hardware computing device into several virtual machines.

A common virtualization system configuration involves creating multiple similarly configured virtual machines, which can then operate independently. Unfortunately, because this common configuration leads to the virtual machines sharing much of the same configuration data, backing up these virtual machines may result in this shared configuration data being included multiple times on the backups, leading to decreased backup performance and inefficient use of storage for the backups.

SUMMARY OF THE INVENTION

Various systems and methods for deduplicating common virtual disks during backups of virtual machines are disclosed. For example, one method involves receiving a request to perform a backup operation to backup one or more virtual machine and performing the backup operation, in response to receiving the request. Performing the backup operation involves detecting whether a virtual disk associated with a virtual machine is already identified in a backup catalog for the backup operation, based upon a globally unique identifier associated with the virtual disk, and selecting to create a reference to a backup copy of the virtual disk instead of creating another copy of the virtual disk, if the backup catalog already identifies the virtual disk. Performing the backup operation can also involve accessing information identifying a hierarchy of virtual disks. Detection as to whether the virtual disk is already identified in the backup catalog can, in some embodiments, be performed in response to the virtual disk being identified as a parent disk in the hierarchy of virtual disks.

The method can additionally involve receiving a request to restore the virtual machine and detecting that the virtual disk is a common virtual disk, in response to the reference to the backup copy. The method can also involve acts such as displaying a message to a user, where the message indicates that restoration of the virtual machine involves restoring a common disk and/or detecting that a pointer to the common virtual disk has been modified subsequent to performance of the backup operation, where a user has specified that restoration of the virtual machine should not overwrite any common virtual disks, and displaying a message to the user, indicating that the pointer has been modified subsequent to the performance of the backup operation.

An example of a system can include one or more processors and memory coupled to the one or more processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
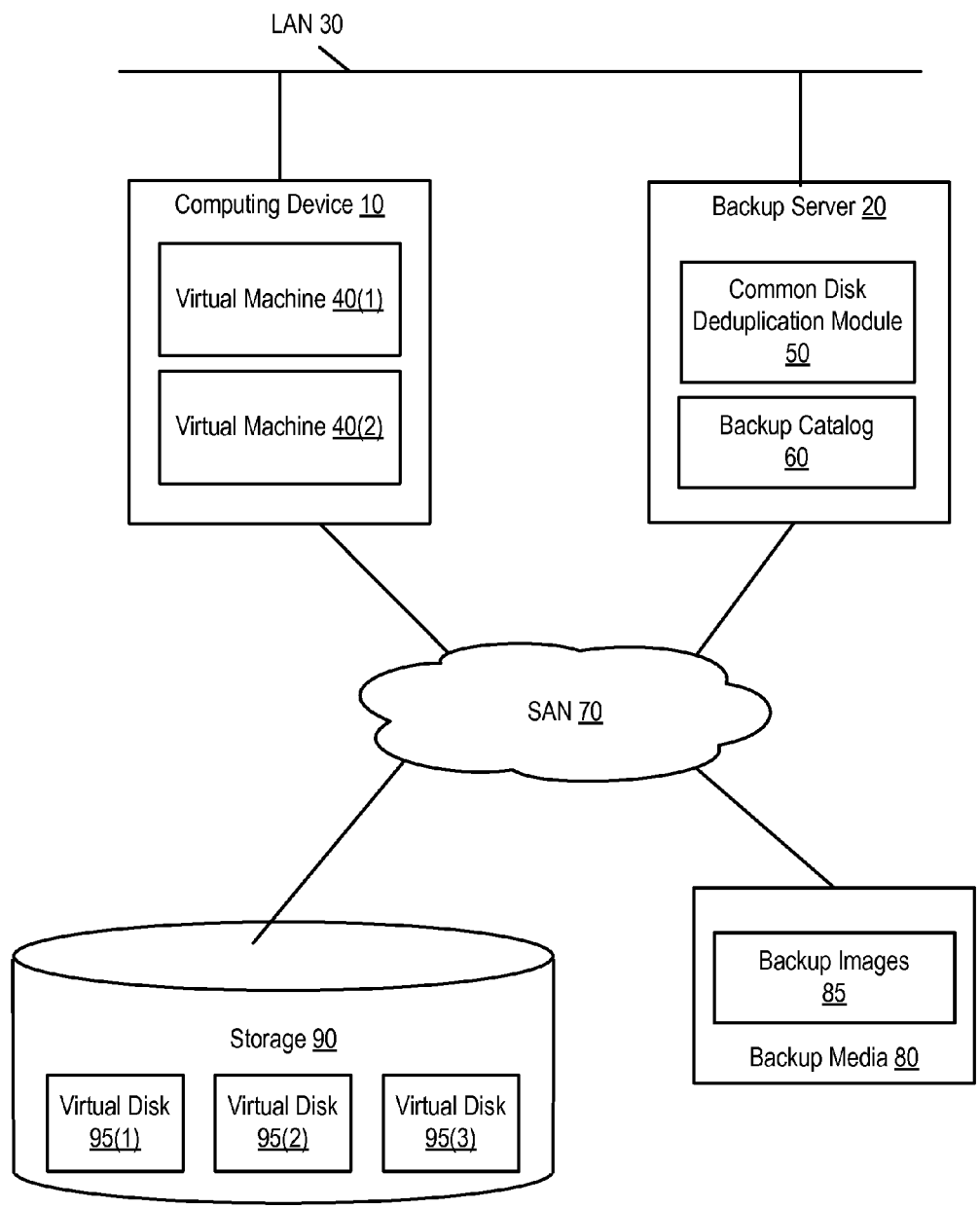
FIG. 1 is a block diagram of a system that deduplicates common virtual disks during backups of virtual machines, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a virtualization system. As shown, the virtualization system includes a computing device 10 and a backup server 20 coupled by a local area network (LAN) 30 (or any other appropriate network or interconnection). Computing device 10 implements two virtual machines (VMs) 40(1) and 40(2). It is noted that alternative embodiments can implement different numbers of VMs per computing device than shown in this example, and the same system can include additional computing devices that each implement the same or different number of VMs than other computing devices within the same system.

The virtual machines VM 40(1)-VM 40(2) each provide a self-contained instance of an executing operating system. VMs executing on the same computing device can be implemented using the same or different operating systems. A client interacting with a VM will typically interact in exactly the same manner that a client would interact with a standalone operating system operating on independent hardware. The virtual machines can be implemented using virtualization software such as that provided by VMware, Inc. of Palo Alto, Calif. or in the HyperV™ family of products, available from Microsoft Corporation of Redmond, Wash.

Backup server 20 is a computing device configured as a backup server (e.g., by executing backup server software available from Symantec Corporation of Mountain View, Calif.). Backup server 20 includes a common disk deduplication module 50 and stores a backup catalog 60, which will be described in more detail below.

Computing device 10 and backup server 20 are, in this example, coupled by storage area network 70 to storage 90. In alternative embodiments, computing device 10 and/or backup server 20 can be coupled to storage 90 by any other appropriate network and/or interconnection. Storage 90 can include one or more of a variety of different storage devices, including hard drives, compact discs, digital versatile discs, solid state drive (SSD) memory such as Flash memory, and the like, or an array (e.g., a just a bunch of disks (JBOD) array, redundant array of inexpensive disks (RAID) array, compact or digital versatile disc jukebox, or the like) or such storage devices.

Storage 90 stores the data used by virtual machines 40(1) and 40(2). As shown, this data is logically subdivided into virtual disks 95(1), 95(2), and 95(3). Such a logical subdivision can be performed by volume management software (e.g., VERITAS Volume Manager, available from Symantec Corporation of Mountain View, Calif.).

In this example, virtual machines 40(1) and 40(2) share similar configuration (e.g., such as the same operating system). Data used to implement this common configuration (e.g., such as a golden template or image) can be stored on virtual disk 95(3), and both virtual machines 40(1) and 40(2) can be configured to use this configuration data. Accordingly, a backup of virtual machine 40(1) would include the data stored in virtual disk 95(3), as would a backup of virtual machine 40(2). Virtual disks that are shared by more than one virtual machine are referred to herein as common virtual disks. Common virtual disks are often configured as read-only disks in order to reduce the chance that one virtual machine could destroy the configuration information used by other virtual machines by overwriting the common configuration. In such situations, any changes made to the common configuration in order to customize one virtual machine are stored on a non-shared virtual disks used by that virtual machine.

Virtual machines 40(1) and 40(2) also access certain virtual disks independently. Here, virtual machine 40(1) accesses (e.g., generates and/or consumes) data in virtual disk 95(1), and virtual machine 40(2) accesses data in virtual disk 95(2). Data in these two virtual disks can include data processed by applications executing in a respective virtual machine, as well as changes made to the common configuration stored in virtual disk 95(3) for a respective virtual machine.

Backup server 20 is configured to backup virtual machines 40(1) and 40(1) by copying the virtual disks used by those virtual machines from storage 90 to backup media 80 and storing each backup (e.g., each copy made at a given point in time) as a backup image. Backup media 80 can store one or more of such backup images 85.

Backup catalog 60 identifies the contents of each backup image and includes metadata usable to restore one or more virtual machines from each backup image. In this example, backup catalog 60 is stored on backup server 20. In other embodiments, backup catalog 60 may also be stored in whole or in part on storage 90 and/or backup media 80 instead of or in addition to being stored on the backup server.

Common disk deduplication module 50 is configured to automatically (without user intervention) detect virtual disks, such as virtual disk 95(3) in this example, that are shared by more than one virtual machine. Upon discovering that a virtual disk is shared by multiple virtual machines, common disk deduplication module 50 is configured to control how that virtual disk is handled during backups of the virtual machines, such that the common virtual disk is only copied once to backup media 80. Common disk deduplication module 50 can update backup catalog 60 to identify common virtual disks and the location of the single copy of each such common virtual disk within a backup image, as well as to identify which virtual machines are associated with each such common virtual disk.

For example, in response to receiving a request to backup virtual machines 40(1) and 40(2), backup server 20 will create a backup image (e.g., one of backup images 85) that includes copies of the data in the virtual disks used by those virtual machines. Backup server 20 will update backup catalog 60 to include information identifying the backup image, the point in time at which the backup image was created, the virtual machines backed up, and the virtual disks used by each virtual machine.

As backup server 20 is creating the backup image in response to the backup request, common disk deduplication module 50 detects that virtual disk 95(3) is shared by both virtual machines being backed up. Accordingly, common disk deduplication module 50 will only allow a single copy of this virtual disk to be included in the backup image, even though the virtual disk is associated with two virtual machines. Common disk deduplication module 50 will update backup catalog 60 to include a reference to the copy of virtual disk 95(3) in the backup image for each of the virtual machines that is associated with virtual disk 95(3).

By automatically detecting which virtual disks are shared by more than one virtual machine, common disk deduplication module 50 is able to increase the storage utilization of backup media 80 by avoiding the unnecessary creation of redundant copies of the same data. Common disk deduplication module 50 also prevents any virtual disks from being misidentified as being common (or not common), as might occur if the identification of virtual disks were done by a user. Additionally, since common disk deduplication module 50 detects common disks at the time that the backup is being made (as opposed to doing so at the time at which the system is initially configured), common disk deduplication module 50 is able to detect the current state (common or non-shared) of each virtual disk targeted by the backup operation, thus avoiding potential errors that could otherwise arise if the state of a virtual disk changed over time.

There are several different techniques that common disk deduplication module 50 can use to identify whether a virtual disk is shared by more than one virtual machine. In one embodiment, common disk deduplication module 50 accesses an interface, such as that provided by VERITAS Mapping Service (VxMS), available from Symantec Corporation of Mountain View, Calif., that identifies a logical hierarchy of virtual disks within the virtualization system. This logical hierarchy identifies parent disks, which can store potentially shared configuration information, and child disks, which are dependent on a parent disk. In such an organization, if a virtual machine's configuration is customized, the basic configuration would remain unchanged on a parent disk, which could potentially be used by multiple virtual machines, while a child disk, which is associated only with the single virtual machine being customized, would store the changes made to provide the customized configuration. In embodiments that provide such an interface, common disk deduplication module 50 can identify any parent disk as a potentially common disk, and any child disk as a non-shared disk.

In other embodiments, common disk deduplication module 50 can detect common virtual disks using a globally unique identifier (GUID) associated with each virtual disk. In particular, as each virtual disk is processed as part of a backup operation, the GUID of that virtual disk can be added to backup catalog 60. Before processing a new virtual disk, common disk deduplication module 50 obtains the new virtual disk's GUID and compares that GUID to the GUIDs already stored in the backup catalog. If the new virtual disk's GUID is already identified in the backup catalog as having been backed at the current backup time, common disk deduplication module 50 determines that the new virtual disk is a common disk that does not need to be copied again during this backup process, since a copy has already been made. If GUIDs are not already assigned to each virtual disk, common disk deduplication module 50 can be configured to assign such GUIDs before proceeding with a backup of the data stored on the identified virtual disks. Such GUIDs are globally unique in that no virtual disk is allowed to have the same GUID as any other virtual disk within the same virtualization system.

Thus, during a backup of a virtualization system at a particular point in time, backup server 20 creates a backup image of the virtual disks included in the virtualization system at that point in time, along with information (e.g., in backup catalog 60) that can be used to restore any of the virtual machines included in the virtualization system to their state at that point in time. For example, for a backup of the system in FIG. 1, the catalog can indicate that virtual machine 40(1) is associated with virtual disks 95(1) and 95(3), as well as the location of the point in time copy of each of those two virtual disks within the backup image on backup media 80. Similarly, the catalog can indicate that virtual machine 40(2) is associated with virtual disks 95(2) and 95(3), as well as the location of the point in time copy of each of those two virtual disks within the backup image. Common disk deduplication module 50 operates to ensure that only one copy of virtual disk 95(3) is stored on backup media 80 for this point in time, while backup catalog 60 associates each of the two virtual machines associated with that virtual disk with that single copy (e.g., by associating the same pointer to the copy of virtual disk 95(3) with both virtual machine 40(1) and virtual machine 40(2) in backup catalog 60).

In some embodiments, when backing up common virtual disks, common disk deduplication module 50 can operate so that only one copy of a common virtual disk is stored on backup media 80, such that multiple different backup images (each created at a different point in time) can refer to that single copy. Because common disk deduplication module 50 identifies common disks based upon metadata such as a hierarchy and/or GUID (as opposed to based upon the data stored on the common disks themselves), this type of deduplication can be performed even if the common virtual disks are defragmented in between backups.

When restoring a virtual machine from a backup image, common disk deduplication module 50 will identify whether that virtual machine's restoration targets any common disks. If so, common disk deduplication module 50 will warn the user (e.g., by displaying a message to the user via a user interface such as a command line interface (CLI) or graphical user interface (GUI)) and prompt the user to indicate whether common disks should be overwritten as part of the restore process. Since the restoration of a common disk has the potential to affect multiple virtual machines that use that common disk, such a warning indicates to the user that the restore operation may unintentionally affect other virtual machines than the one being restored.

If a user chooses to overwrite common disks during the restore process, backup server 20 will use backup catalog 60 to identify all of the virtual disks associated with the virtual machine being restored in the particular backup image selected for use in restoration, as well as the locations of the copies of the identified virtual disks on backup media 80. All of the identified virtual disks will be restored (i.e., the virtual disks in storage 90 will be replaced with the data stored in the point in time copies of those virtual disks on backup media 80), regardless of whether those virtual disks are common or non-shared.

If instead a user chooses not to overwrite common disks during the restore process, backup server 20 will only restore the non-shared disks identified by backup catalog 60 as being associated with the virtual machine being restored. In some embodiments, prior to restoring the virtual machine, common disk deduplication module 50 can compare information in the backup image with information in storage 90 to determine whether any of the common disks associated with that virtual machine have been relocated subsequent to the backup. If so, common disk deduplication module 50 can display an error message, indicating that the virtual machine may not be able to find the common disks it uses subsequent to being restored. Alternatively, common disk deduplication module 50 can update the necessary pointers and/or provide the information necessary to update these pointers to the user.

Since common disk deduplication module 50 automatically identifies the presence of common disks in a backup image, users are not required to identify such common disks themselves. This can prevent errors that would arise if a user unintentionally misidentified a common disk as a non-shared disk during the restore process, which could result in, for example, the configuration information for multiple virtual machines being overwritten.

It is noted that the techniques used by common disk deduplication module 50 to detect common virtual disks in virtualization systems are not conventional deduplication techniques that rely on processing the actual data being deduplicated (e.g., to calculate a data signature). Instead, common disk deduplication module 50 is able to identify whether a virtual disk is common or not based upon metadata associated with the virtual disk itself, without needing to process the data stored on the virtual disk to make the identification.

It is noted that common disk deduplication module 50 can also be used in systems other than backup systems. For example, a virus scanner in a virtualization system can include common disk deduplication module 50 in order to avoid scanning the same common disks multiple times when performing virus scans for multiple virtual machines.

Figure 2:
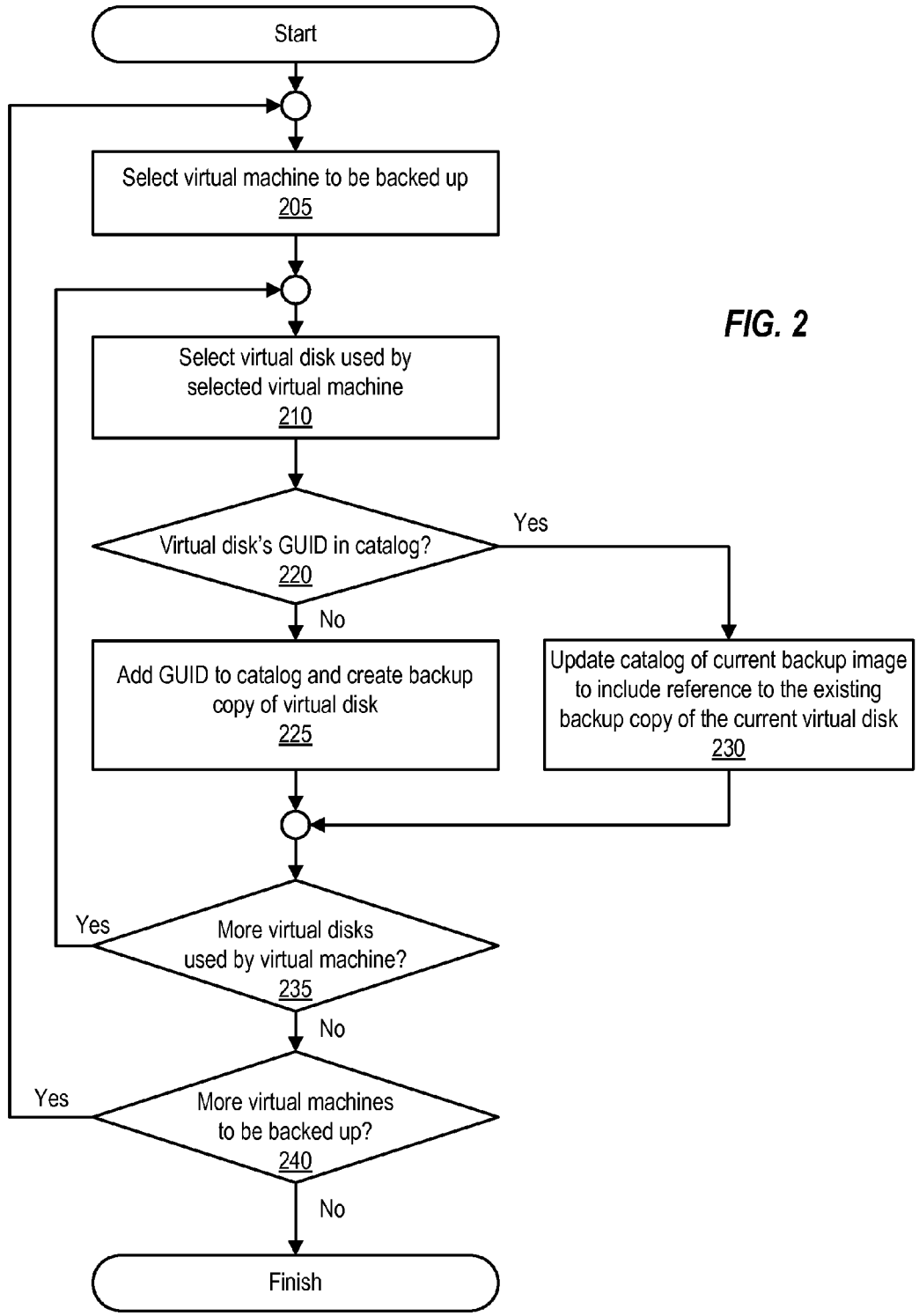
FIG. 2 is a flowchart of a method of deduplicating common virtual disks during backups of virtual machines, according to one embodiment of the present invention.

FIG. 2 is a flowchart of a method of deduplicating common virtual disks during backups of virtual machines. This method can be performed by a backup server that includes a common disk deduplication module like module 50 of FIG. 1.

The method begins when a user requests a backup of one or more virtual machines in a virtualization system at a particular point in time. In response, the backup server begins backing up each virtual machine. Thus, the backup server selects a virtual machine to back up, as shown at 205.

The backup server then identifies the virtual disks associated with (e.g., used by) the virtual machine selected at 205 and selects one of these virtual disks for processing, as shown at 210. The common disk deduplication module within the backup server determines whether this virtual disk's GUID is already included in the backup catalog (e.g., in an entry for the backup image currently generated and/or in an entry for a prior backup image, if the data on the virtual disk has not been modified since the prior backup), as shown at 220. If the virtual disk's GUID is not already included in the catalog, the common disk deduplication module will add the virtual disk's GUID to the catalog and cause a backup copy of the virtual disk to be created on the backup media (e.g., by adding the virtual disk to a list of virtual disks to be copied by the backup server), as shown at 225. If instead the virtual disk's GUID is already included in the catalog, the common disk deduplication module will prevent another copy of the virtual disk from being created on the backup media, and will instead simply update the catalog to include a reference to (e.g., a pointer or other identifying information for) a backup copy of the virtual disk already stored on the backup media, as shown at 230.

After processing each virtual disk according to operations 220, 225, and/or 230, the backup server will determine whether there are additional, unprocessed virtual disks used by the selected virtual machine, as shown at 235. If so, the backup server will process those additional virtual disks. Once all of the virtual disks associated with a given virtual machine have been processed, the backup server will determine if there are more virtual machines to be backed up, as shown at 240. If so, the method shown in FIG. 2 will be repeated for each additional virtual machine.

Figure 3:
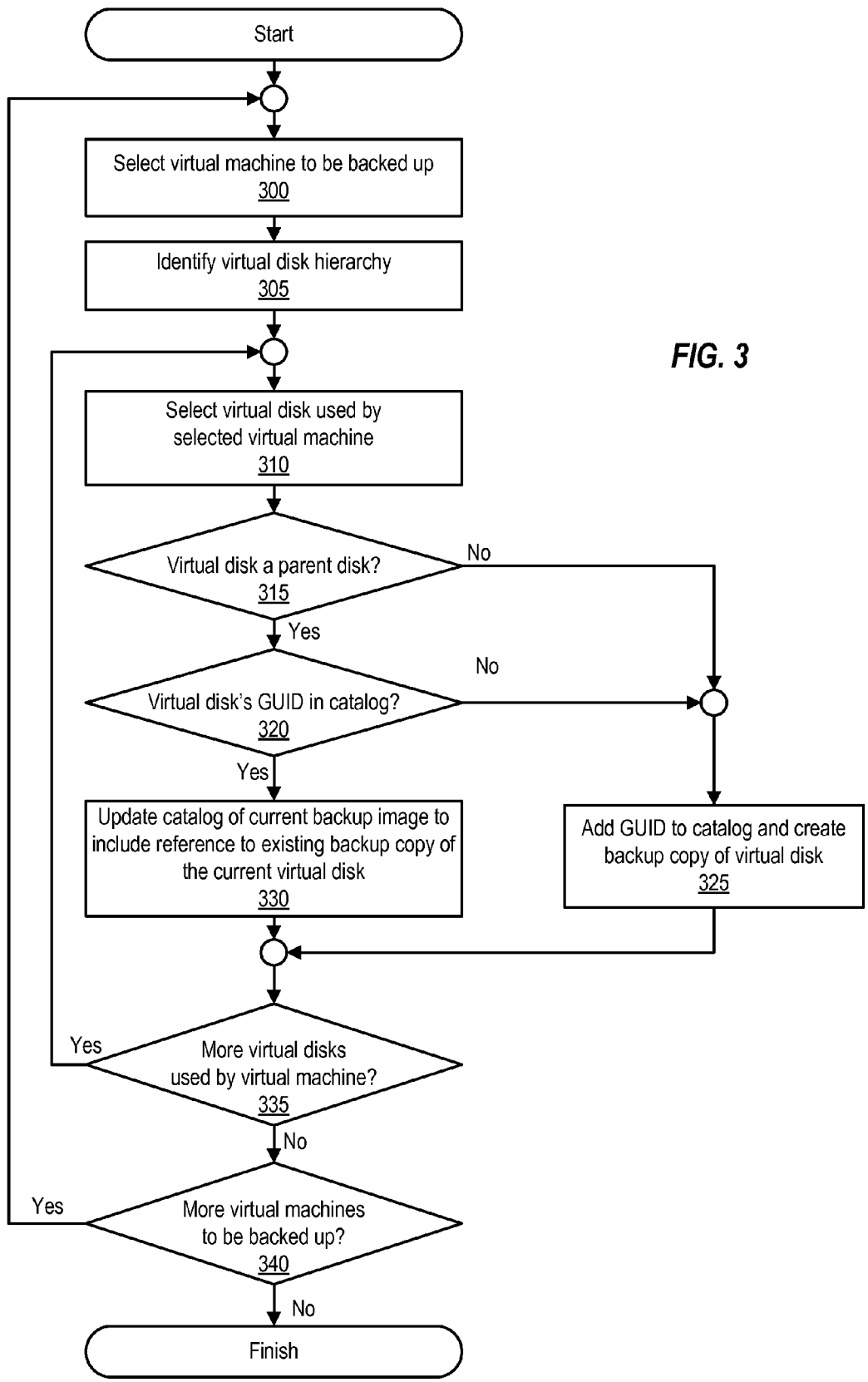
FIG. 3 is a flowchart of another method of deduplicating common virtual disks during backups of virtual machines, according to one embodiment of the present invention.

FIG. 3 is a flowchart of another method of deduplicating common virtual disks during backups of virtual machines. Like the method of FIG. 2, this method can be performed by a backup server that includes a common disk deduplication module.

At 300, the backup server selects a virtual machine (from the set of one or more virtual machines specified by a user in a backup request) to be backed up, as shown at 300. The common disk deduplication module in the backup server then identifies a hierarchy of virtual disks used by virtual machines in a virtualization system, as shown at 305. The hierarchy identifies which virtual disks are parent disks, which can potentially be shared by multiple virtual machines, and which virtual disks are child disks, which cannot be shared.

The backup server then identifies the virtual disks associated with (e.g., used by) the virtual machine selected at 300 and selects one of these virtual disks for processing, as shown at 310.

At 315, the common disk deduplication module within the backup server determines whether this virtual disk is a parent disk or a child disk, based upon the information identified at 305. If the disk is a parent disk, the common disk deduplication module then determines if the virtual disk's GUID is already included in the catalog, as shown at 320.

If the virtual disk is a child disk, or if a parent disk's GUID is not already included in the catalog, the common disk deduplication module will add that virtual disk's GUID to the catalog and cause a backup copy of the virtual disk to be created on the backup media (e.g., by adding the virtual disk to a list of virtual disks to be copied by the backup server), as shown at 325.

If instead a parent virtual disk's GUID is already included in the catalog, the common disk deduplication module will prevent another copy of the virtual disk from being created on the backup media, and will instead simply update the catalog to include a reference to (e.g., a pointer or other identifying information for) a backup copy of the parent disk already stored on the backup media, as shown at 330.

After processing each virtual disk according to operations 315, 320, 325, and/or 330, the backup server will determine whether there are additional, unprocessed virtual disks used by the selected virtual machine, as shown at 335. If so, the backup server will process those additional virtual disks. Once all of the virtual disks associated with a given virtual machine have been processed, the backup server will determine if there are more virtual machines to be backed up, as shown at 340. If so, the method shown in FIG. 3 will be repeated for each additional virtual machine.

Figure 4:
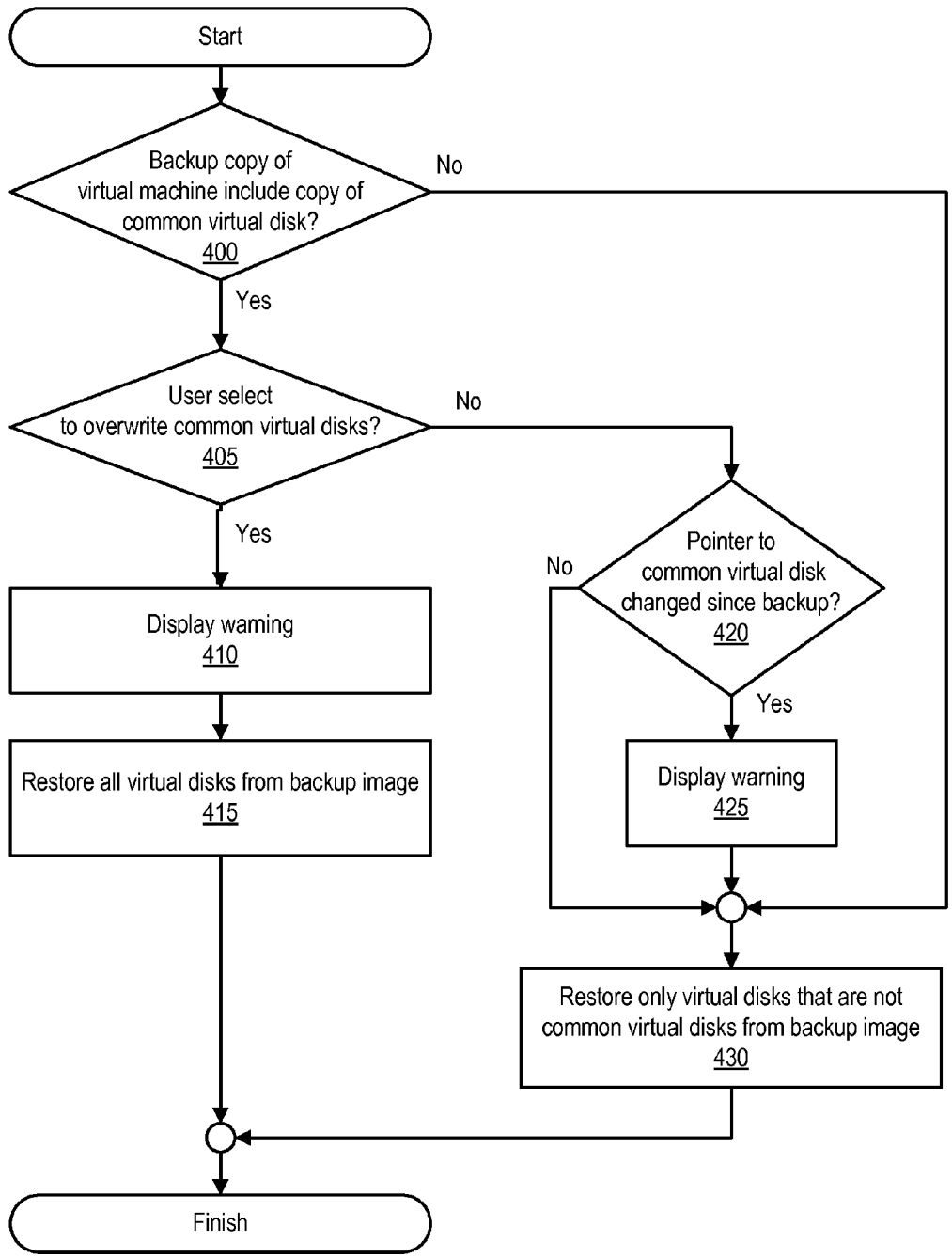
FIG. 4 is a flowchart of a method of restoring a virtual machine from a backup made during a backup process that deduplicated common virtual disks, according to one embodiment of the present invention.

FIG. 4 is a flowchart of a method of restoring a virtual machine from a backup made during a backup process that deduplicated common virtual disks. This method can be performed by a backup server that includes a common disk deduplication module, like common disk deduplication module 50 shown in FIG. 1.

The method begins when a user selects to restore a particular virtual machine from a particular backup image. In response, the backup server deletes the existing instance of the virtual machine (if it exists) and then recreates (or simply creates) a new instance of the virtual machine. The backup server then searches the backup catalog associated with the selected backup image for information identifying which virtual disks are associated with the selected virtual machine at the point in time associated with the backup image.

At 400, the common disk deduplication module will identify whether any of the virtual disks associated with the virtual machine are common virtual disks. For example, the common disk deduplication module can search a backup catalog to see if multiple virtual devices are associated with the same copy of the same virtual disk (e.g., based upon a comparison of pointers and/or GUIDs in the backup catalog). If so, the common disk deduplication module can display a warning to the user (not shown) indicating that common disks are associated with the virtual machine being restored.

The common disk deduplication module can then determine whether the user has selected to overwrite common disks during the restore process, as shown at 405. This determination can be made, for example, by prompting the user to select whether to overwrite common virtual disks during the restore process. Such a prompt can indicate whether there are common disks and/or identify the particular common disk(s) potentially affected by the restore process.

If the user has selected to overwrite the common virtual disk(s), the common disk deduplication module can display a warning (this can be instead of or in addition to any other warnings), as indicated at 410. This warning can indicate that the restoration process will overwrite one or more common disks and/or identify the common disk(s) being affected, and may also give the user a chance to cancel the restore operation. If the restore operation proceeds, the backup server will restore all of the virtual disks, both common and non-shared, associated with the virtual machine from the backup image, as, shown at 415.

If the user has not selected to overwrite common virtual disks but the virtual machine is associated with a common virtual disk, the common disk deduplication module will determine whether any pointer to that common virtual disk has been modified since the backup image was created, as shown at 420. If so, the common disk deduplication module can display a warning message to that effect to the user, as shown at 425. The warning can include information (e.g., new pointer values) needed to properly configure the restored virtual machine. Alternatively, the warning may include an option for the common disk deduplication module to perform this configuration task automatically for the user, subsequent to the restoration.

If the virtual machine is not associated with any common disks, or if the pointers to any common virtual disks have not been modified (or the user has been appropriately warned of a modification) and the user has selected to not overwrite common virtual disks, the backup server will perform the restoration by restoring only the non-shared virtual disks from the backup image, as shown at 430.

Figure 5:
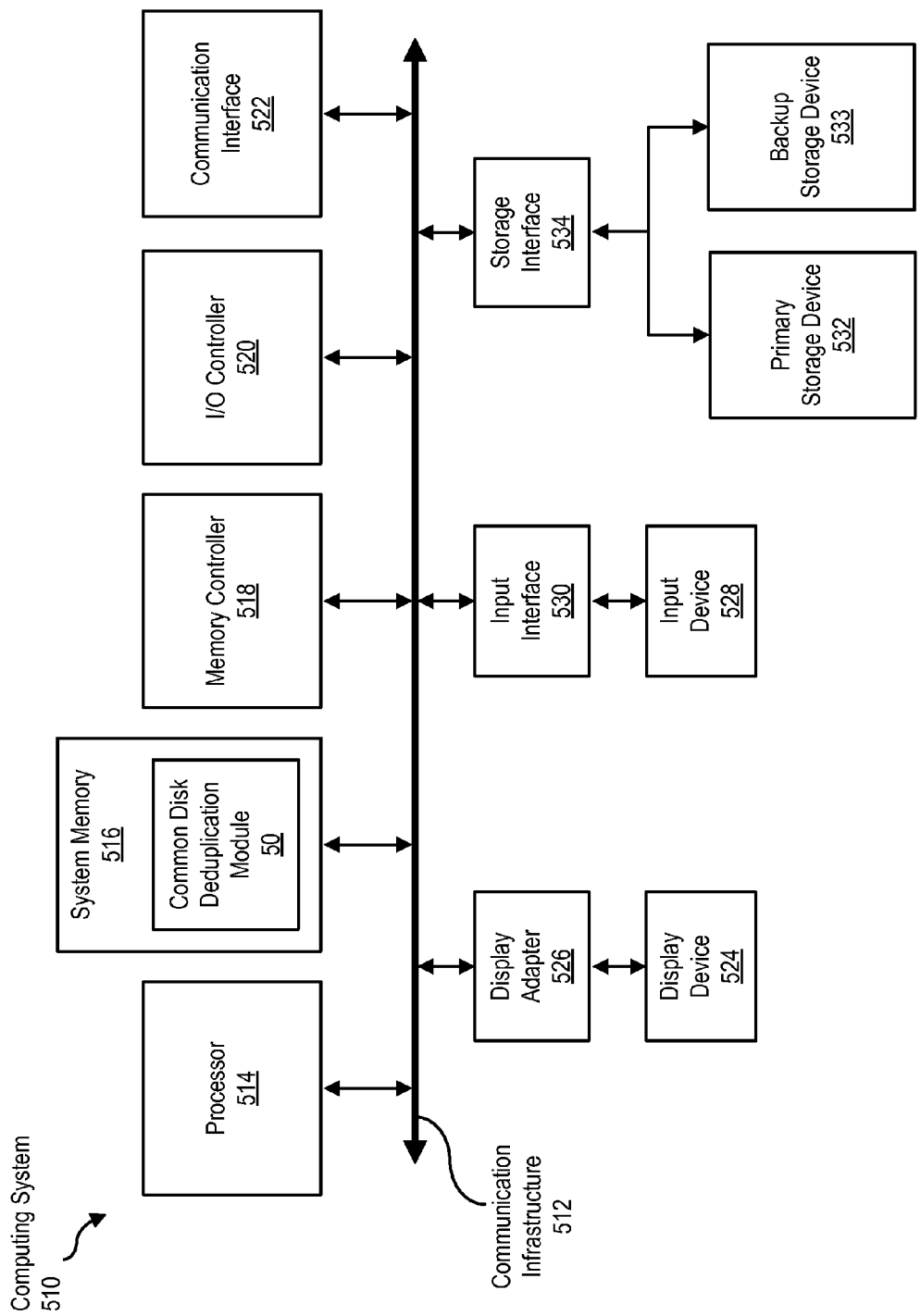
FIG. 5 is a block diagram of a computing device, illustrating how a common disk deduplication module can be implemented in software, according to one embodiment of the present invention.

FIG. 5 is a block diagram of a computing system 510 capable of implementing a common disk deduplication module as described above. Computing system 510 broadly represents any single or multi-processor computing device or system capable of executing computer-readable instructions. Examples of computing system 510 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 510 may include at least one processor 514 and a system memory 516. By executing the software that implements a common disk deduplication module, computing system 510 becomes a special purpose computing device that is configured to deduplicate common disks used by virtual machines when backing up those virtual machines.

Processor 514 generally represents any type or form of processing unit capable of processing data or interpreting and executing instructions. In certain embodiments, processor 514 may receive instructions from a software application or module. These instructions may cause processor 514 to perform the functions of one or more of the embodiments described and/or illustrated herein. For example, processor 514 may perform and/or be a means for performing the operations described herein. Processor 514 may also perform and/or be a means for performing any other operations, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, program instructions executable to implement a common disk deduplication module 50 (e.g., as shown in FIG. 1) may be loaded into system memory 516.

In certain embodiments, computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the operations or features described and/or illustrated herein.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, computing system 510 may also include at least one input device 528 coupled to communication infrastructure 512 via an input interface 530. Input device 528 generally represents any type or form of input device capable of providing input, either computer or human generated, to computing system 510. Examples of input device 528 include, without limitation, a keyboard, a pointing device, a speech recognition device, or any other input device.

As illustrated in FIG. 5, computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. A storage device like primary storage device 532 can store information such as backup images and/or a backup catalog, as described above.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5.

Computing system 510 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 510 for storage in memory via a network such as the Internet or upon a carrier medium.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the embodiments described and/or illustrated herein. Additionally or alternatively, one or more of the embodiments described and/or illustrated herein may be implemented in firmware and/or hardware. For example, computing system 510 may be configured as an application specific integrated circuit (ASIC) adapted to implement one or more of the embodiments disclosed herein.

Figure 6:
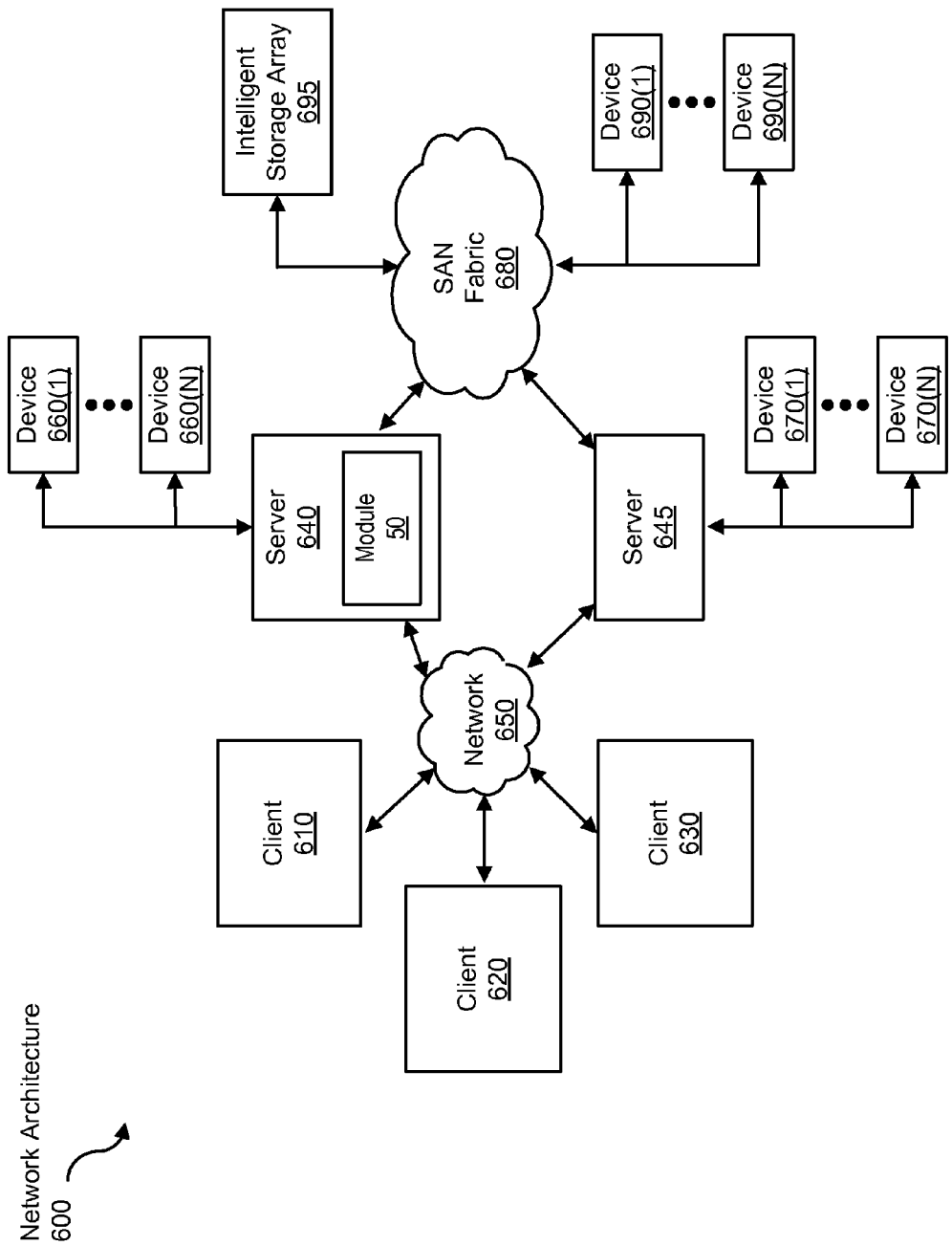
FIG. 6 is a block diagram of a networked system, illustrating how various computing devices can communicate via a network, according to one embodiment of the present invention.

FIG. 6 is a block diagram of a network architecture 600 in which client systems 610, 620, and 630 and servers 640 and 645 may be coupled to a network 650. Client systems 610, 620, and 630 generally represent any type or form of computing device or system, such as computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, one or more of client systems 610, 620, and/or 630 and/or servers 640 and/or 645 may include a common disk deduplication module as shown in FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as Network File System (NFS), Server Message Block (SMB), or Common Internet File System (CIFS). Such storage devices can store backup images and/or backup catalogs, as described above.

Servers 640 and 645 may also be connected to a storage area network (SAN) fabric 680. SAN fabric 680 generally represents any type or form of computer network or architecture capable of facilitating communication between multiple storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the embodiments disclosed herein may also be encoded as a computer program, stored in server 640, run by server 645, and distributed to client systems 610, 620, and 630 over network 650.

In some examples, all or a portion of one of the systems in FIGS. 1, 5, and 6 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a common disk deduplication module, operating as part of a backup server, may transform the backup images generated by that backup server into backup images that include only a single copy of any given virtual disk.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a request to perform a backup operation to backup a first virtual machine;
performing the backup operation, in response to the receiving the request, wherein the performing the backup operation comprises:
determining a first identifier of a first virtual disk, wherein
the first virtual disk is associated with the first virtual machine;
determining whether the first identifier is included in a plurality of identifiers by comparing the first identifier to the plurality of identifiers,
in response to a determination that the first identifier is included in the plurality of identifiers, determining that a first backup copy of the first virtual disk is already stored in a backup storage, wherein
the first virtual disk is a common virtual disk, and
the first virtual disk is shared by the first virtual machine and at least a second virtual machine to store common configuration data used by both the first virtual machine and the second virtual machine
updating a backup catalog to include a reference to the first backup copy of the first virtual disk already stored in the backup storage instead of creating another copy of the first virtual disk in the backup storage, wherein
the reference indicates a location of the first backup copy in the backup storage, and
the reference associates the first virtual machine and the second virtual machine with the first virtual disk;
receiving another request to restore the first virtual machine from a backup image;
detecting that the first virtual disk is the common virtual disk, in response to the reference being associated with a second virtual machine;
detecting that a pointer to the common virtual disk has been modified subsequent to performance of the backup operation, wherein
a user has specified that restoration of the first virtual machine should not overwrite any common virtual disks; and
displaying a message to the user, indicating that the pointer has been modified subsequent to the performance of the backup operation.

2. The method of claim 1, wherein the performing the backup operation further comprises accessing information identifying a hierarchy of virtual disks.

3. The method of claim 2, further comprising:
identifying the first virtual disk as a common virtual disk, in response to the first virtual disk being identified as a parent disk in the hierarchy of virtual disks.

4. The method of claim 1, further comprising displaying a message to a user, wherein
the message indicates that restoration of the first virtual machine involves restoring the common virtual disk.

5. The method of claim 1, wherein
the first identifier is a first globally unique identifier (GUID), and
the plurality of identifiers is a plurality of globally unique identifiers (GUIDs).

6. The method of claim 1, wherein
the first backup copy of the first virtual disk was created at a point in time,
the updating the backup catalog is performed in response to a determination that the first virtual disk has not been modified since the point in time, and
the updating the backup catalog further comprises:
associating a pointer with the first virtual machine, wherein
the pointer identifies the first backup copy in the backup storage.

7. The method of claim 6, further comprising:
identifying the first virtual disk as a common virtual disk, in response to detecting that the pointer is also associated with a second virtual machine.

8. The method of claim 1, wherein
the plurality of identifiers is stored in a backup catalog, and
each of the plurality of identifiers identify one of a plurality of backup copies of virtual disks stored in backup storage.

9. The method of claim 1, wherein
the common configuration data is used to implement a common configuration between the first virtual machine and the second virtual machine.

10. A system comprising:
one or more processors; and
a memory coupled to the one or more processors, wherein the memory stores program instructions executable to:
receive a request to perform a backup operation to backup a first virtual machine;

perform the backup operation, in response to the receiving the request, wherein to perform the backup operation the program instructions are executable to:
    determine a first identifier of a first virtual disk, wherein
        the first virtual disk is associated with the first virtual machine;
    determine whether the first identifier is included in a plurality of identifiers by comparing the first identifier to the plurality of identifiers,
    determine that a first backup copy of the first virtual disk is already stored in a backup storage, in response to a determination that the first identifier is included in the plurality of identifiers, wherein
        the first virtual disk is a common virtual disk, and
        the first virtual disk is shared by the first virtual machine and at least a second virtual machine to store common configuration data used by both the first virtual machine and the second virtual machine, and
    update a backup catalog to include a reference to the first backup copy of the first virtual disk already stored in the backup storage instead of creating another copy of the first virtual disk in the backup storage, wherein
        the reference indicates a location of the first backup copy in the backup storage, and
        the reference associates the first virtual machine and the second virtual machine with the first virtual disk;
receive another request to restore the first virtual machine from a backup image;
detect that the first virtual disk is the common virtual disk, in response to the reference being associated with a second virtual machine;
detect that a pointer to the common virtual disk has been modified subsequent to performance of the backup operation, wherein
    a user has specified that restoration of the first virtual machine should not overwrite any common virtual disks; and
display a message to the user, indicating that the pointer has been modified subsequent to the performance of the backup operation.

11. The system of claim 10, wherein performance of the backup operation comprises accessing information identifying a hierarchy of virtual disks.

12. The system of claim 11, wherein the program instructions are further executable to:
identify the first virtual disk as a common virtual disk, in response to the first virtual disk being identified as a parent disk in the hierarchy of virtual disks.

13. The system of claim 10, wherein
the plurality of identifiers is stored in a backup catalog, and each of the plurality of identifiers identify one of a plurality of backup copies of virtual disks stored in backup storage.

14. The system of claim 10, wherein
the common configuration data is used to implement a common configuration between the first virtual machine and the second virtual machine.

15. A non-transitory computer readable storage medium storing program instructions executable to:
receive a request to perform a backup operation to backup a first virtual machine;
perform the backup operation, in response to the receiving the request, wherein to perform the backup operation the program instructions are executable to:
    determine a first identifier of a first virtual disk, wherein
        the first virtual disk is associated with the first virtual machine;
    determine whether the first identifier is included in a plurality of identifiers by comparing the first identifier to the plurality of identifiers
    determine that a first backup copy of the first virtual disk is already stored in a backup storage, in response to a determination that the first identifier is included in the plurality of identifiers, wherein
        the first virtual disk is a common virtual disk, and
        the first virtual disk is shared by the first virtual machine and at least a second virtual machine to store common configuration data used by both the first virtual machine and the second virtual machine,
    update a backup catalog to include a reference to the first backup copy of the first virtual disk already stored in the backup storage instead of creating another copy of the first virtual disk in the backup storage, wherein
        the reference indicates a location of the first backup copy in the backup storage, and
        the reference associates the first virtual machine and the second virtual machine with the first virtual disk;
receive another request to restore the first virtual machine from a backup image;
detect that the first virtual disk is the common virtual disk, in response to the reference being associated with a second virtual machine;
detect that a pointer to the common virtual disk has been modified subsequent to performance of the backup operation, wherein
    a user has specified that restoration of the first virtual machine should not overwrite any common virtual disks; and
display a message to the user, indicating that the pointer has been modified subsequent to the performance of the backup operation.

16. The non-transitory computer readable storage medium of claim 15, wherein performance of the backup operation comprises accessing information identifying a hierarchy of virtual disks.

17. The non-transitory computer readable storage medium of claim 15, wherein the program instructions are further executable to:
identify the first virtual disk as a common virtual disk, in response to the virtual disk being identified as a parent disk in the hierarchy of virtual disks.

18. The non-transitory computer readable storage medium of claim 15, wherein the program instructions are further executable to:
receive a request to restore the first virtual machine from a backup image; and
detect that the first virtual disk is a common virtual disk, in response to the pointer being associated with a second virtual machine.

19. The non-transitory computer readable storage medium of claim 18, wherein the program instructions are further executable to
display a message to a user, wherein
    the message indicates that restoration of the first virtual machine involves restoring the common virtual disk.

20. The non-transitory computer readable storage medium of claim 16, wherein
the pointer is stored in a backup catalog, and
the pointer identifies one of a plurality of backup copies of virtual disks stored in backup storage.

21. The non-transitory computer readable storage medium of claim 16, wherein the common configuration data is used to implement a common configuration between the first virtual machine and the second virtual machine.

\* \* \* \* \*

UNITED STATES PATENT AND TRADEMARK OFFICE
CERTIFICATE OF CORRECTION

PATENT NO. : 9,037,547 B1
APPLICATION NO. : 12/882373
DATED : May 19, 2015
INVENTOR(S) : Shivdeo It is certified that error appears in the above-identified patent and that said Letters Patent is hereby corrected as shown below:

In the claims
Column 16
Line 52, Claim 17, replace: "the virtual" by -- the first virtual --

Signed and Sealed this
Third Day of May, 2016

Michelle K. Lee
*Director of the United States Patent and Trademark Office*